Nov. 5, 1968  W. L. KUECHLER  3,409,278
CONTACTING METHOD AND APPARATUS
Filed March 4, 1965  5 Sheets-Sheet 1

INVENTOR.
WILLIAM L. KUECHLER
BY
Nelson E. Kimmelman
ATTORNEY

Nov. 5, 1968  W. L. KUECHLER  3,409,278
CONTACTING METHOD AND APPARATUS
Filed March 4, 1965  5 Sheets-Sheet 3

INVENTOR.
BY WILLIAM L. KUECHLER
Nelson E. Kimmelman
ATTORNEY

Nov. 5, 1968  W. L. KUECHLER  3,409,278
CONTACTING METHOD AND APPARATUS
Filed March 4, 1965  5 Sheets-Sheet 4

INVENTOR.
WILLIAM L. KUECHLER
BY Nelson E. Kimmelman
ATTORNEY

Nov. 5, 1968  W. L. KUECHLER  3,409,278
CONTACTING METHOD AND APPARATUS
Filed March 4, 1965  5 Sheets-Sheet 5

INVENTOR.
WILLIAM L. KUECHLER
BY
Nelson E. Kimmelman
ATTORNEY

United States Patent Office 3,409,278
Patented Nov. 5, 1968

3,409,278
CONTACTING METHOD AND APPARATUS
William Lewis Kuechler, North Haven, Conn., assignor to Entoleter, Inc., Hamden, Conn., a corporation of Delaware
Filed Mar. 4, 1965, Ser. No. 437,094
24 Claims. (Cl. 261—79)

ABSTRACT OF THE DISCLOSURE

A method and apparatus for contacting a gas and a liquid. In a cooling application air is sucked by a fan into the apparatus from two opposite sides and passed upward to a first set of angled vanes. The vanes impart an inward and upward spiral movement to the air in a contacting zone. Water is distributed in the zone and becomes dispersed into droplets due to the air currents. Because of the centrifugal force exerted on the water particles by the spiral air movement, a circulating suspension of various-sized liquid particles is set up in a first contacting region above the first set of vanes. A second similar contacting region is provided above a second set of angled vanes disposed inwardly and upwardly of the first set. The air passes inwardly and upwardly through both contacting regions and the fan causes it to leave the contacting zone toward the center thereof whereupon it is pumped to the ambient air at generally right angles to the incoming air.

---

This invention relates to a contacting apparatus and in particular to a contacting apparatus for heat-exchange purposes.

Many types of air conditioning (cooling) apparatus are known, some of which involve compression and decompression of a gas, some of which involve evaporation, some of which involve the application of the Peltier effect, etc.

For very large installations, a common method of air conditioning for cooling purposes employs water as a heat-exchanger which is circulated throughout the enclosure to be cooled. The water is warmed by heat in the enclosure and is then drawn off so that it can itself be cooled by exposure to the atmosphere in units external to the cooled chamber. Such units often take the form of water towers located atop the installation whose interior is to be cooled. In general, because these units are relatively inefficient, they displace a relatively large volume and are quite heavy.

These water towers conventionally comprise generally oblong boxes having a number of horizontal wood slats laid lengthwise in a predetermined arrangement such as a diamond formation, for example. Below the slats are a set of fans which blow air upwards. The warmed water is permitted to drop downward on the slats counter to the air rushing up. The air tends to break the water up into particles thereby promoting heat-exchange. This heat-exchange and evaporation cools the water which (to the extent it is not evaporated) is recirculated into the enclosure for additional cooling effects. An average tower may dissipate say, 8½ B.t.u. per pound of air.

Conventional water towers are relatively heavy and may require special roof bracing. As they are quite large their original cost may be considerable.

There is a need for water towers which have less weight, less volume, less complexity, and better construction than those conventionally available. It is among the objects of the present invention to meet this need and thereby effect savings in installation costs because of less elaborate and lighter supporting structures and also effecting savings in total space requirements. Viewed from another standpoint, there is a need for a water cooling tower which, for approximately the same volume and dimensions as conventional towers, gives a greater B.t.u. rating, requires less additional water per cycle, needs less power, and is capable of reducing the temperature of the particular enclosure closer to the desired standard temperature (78° wet bulb), and, being capable of producing a greater differential between the temperature of the water entering it and the temperature of the water leaving it.

In accordance with the present invention, water cooling towers are provided which have a predetermined number of stages disposed about a high speed fan. Each stage comprises a water-atmosphere contact region for heat-exchange purposes and a compressor section for creating movement of atmospheric air through the water and warmed air out of the apparatus. The combined effects of the fan and the directionalized input of air and water create a rapidly moving, swirling air-water current in the heat-exchange region of each stage. Large numbers of water particles of various sizes are suspended or entrained in the air current, the larger particles being impelled outwardly under the influence of centrifugal force. Only the heated air can fully traverse the heat-exchange region by way of the centrally located fan which then pumps it out via the compressor section of the stage. In the forms of the invention shown herein, each stage has generally downwardly sloping walls to enable the cooled water to proceed downwardly into the coolant circulatory system under the influence of gravity.

Overall construction

Referring generally to the figures herein one form of my novel apparatus is indicated generally at the numeral 10. It is supported by four hollow vertical posts 11, 12, 13 and 14 which also serve as water inlet and outlet ducts in a manner to be explained later. As shown in FIGS. 1, 2, 3 and 4, there are top and bottom members 16 and 29A respectively, both of which have shapes generally similar to truncated cones. Both members 16 and 29A have central apertures through which a fan shaft 19 is passed. The top end of the shaft 19 is journalled in a bearing indicated generally at the numeral 18. The bottom end passes through a bearing 20 and is connected to a driving source of rotation such as the motor 22 which is suspended between two parallel sides of a bracket 24. The bracket is affixed to the under side of a cross member which is attached to structural members connected to the four vertical posts.

The apparatus 10 includes two (or any desired number) stages. The upper stage is bounded by the member 16 and the member 29b. The lower stage is bounded by member 29b and member 29a. The upper stage is divided generally into a compressor section and a heat-exchange section by member 28b; member 28a does the same for the lower stage.

Figure 1:
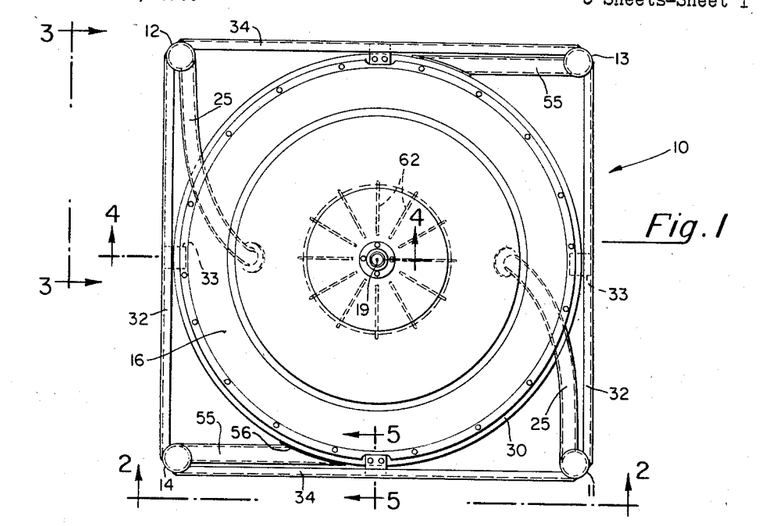
FIGURE 1 is a plan view of the novel cooling apparatus constructed in accordance with one form of this invention.
Figure 2:
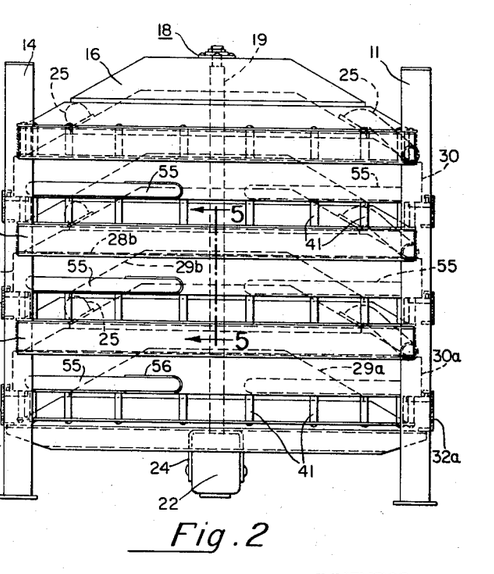
FIGURE 2 is a front elevation view of the novel apparatus as viewed along line 2—2 of FIGURE 1.
Figure 3:
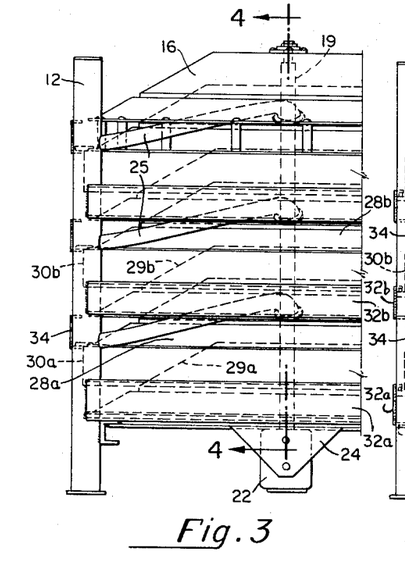
FIGURE 3 is a partial side elevation view of the apparatus as viewed from line 3—3 of FIG. 1.
Figure 4:
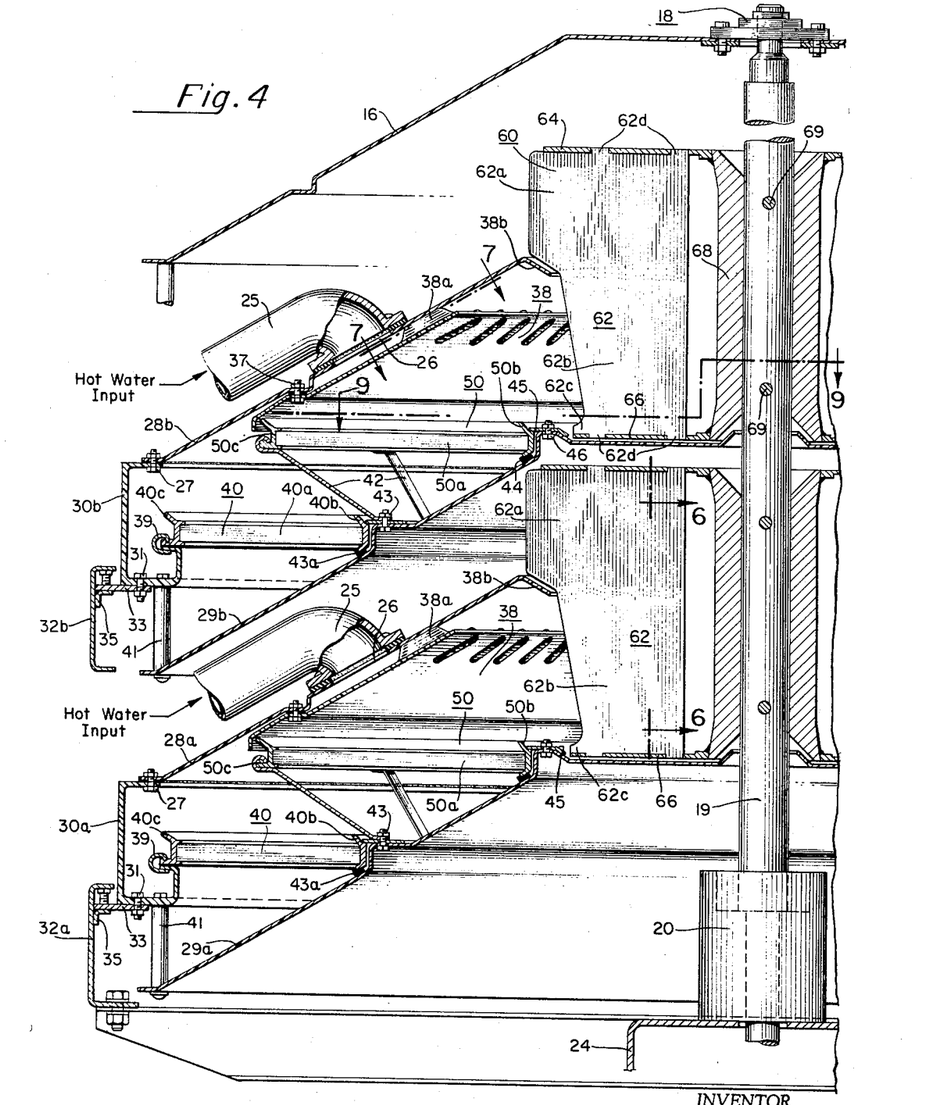
FIGURE 4 is a fragmentary sectional view taken along the section line 4—4 of FIG. 1 (or FIG. 3) in the direction indicated.
Figure 5:
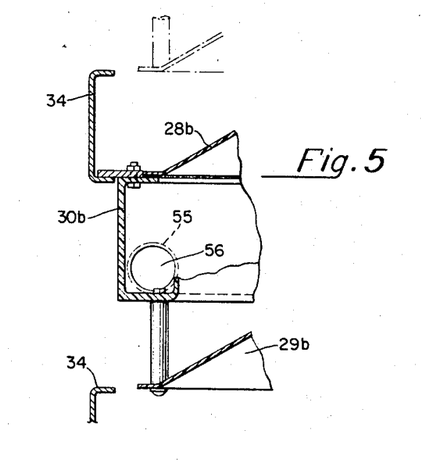
FIGURE 5 is a sectional view taken along the section line 5—5 of FIG. 2 (or FIG. 1) in the direction indicated.

As may be seen in FIG. 2, the side of the apparatus 10 which appears closest to the reader includes a number of horizontal C-sectioned beams 34 whose ends are connected as by welding to the hollow posts 11 and 14. On the opposite side of the apparatus remote from the reader, there are a corresponding number of parallel C-sectioned beams 34 having their ends welded to posts 12 and 13. There are also two other sets of horizontal C-beams disposed on the other two sides of the apparatus 10 at right angles to the beams 34. These other sets are the beams 32 as shown in FIG. 4 whose ends are connected to the posts 12 and 14 on one side and, on the other side, to the posts 11 and 13. For aid in explaining the structure of the apparatus, the two lower beams 32 are termed 32a and 32b respectively, the latter being the higher set.

The beams 32 support generally cylindrical annular members 30, the lowest being designated 32a and the next lowest 30b. The members 30 are screwed by bolt and nut assemblies 31 to horizontal plates 33 which are themselves attached to inverted L-sectioned ledges 35 that are welded to the inside vertical surfaces of the beams 32.

The members 30 have generally G-shaped cross-sections, the upper part of which provides support for the lower edges of the conical members 28, the two lowest being numbered 28a and 28b. Peripherally spaced apertures are formed in the upper section of the members 30 to permit the introduction of nut and bolt assemblies 27 which affix the outer edges of the members 28 thereto. Each of the members 28 has formed therein two oppositely-disposed apertures 26. Communicating with each of the two apertures in each member 28 are hot water input or inlet tubes 25 whose other ends communicate with the hollow interiors of the posts 11 and 12 respectively. The members 28 are the lower boundaries of the compressor sections just above them and are the upper boundaries of the heat-exchange sections just below them. The lower ends of the posts 11 and 12 communicate with the circulatory system for the coolant throughout the enclosure to be cooled.

Figure 7:
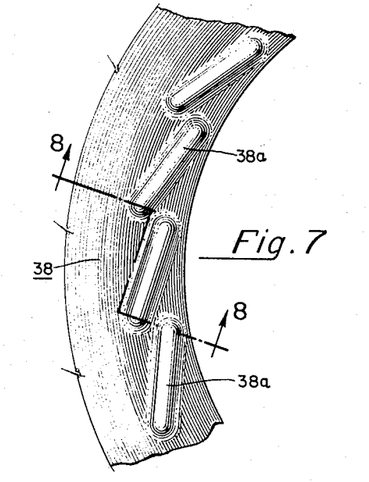
FIGURE 7 is a plan view of part of the apparatus shown in FIG. 4 as seen from the line 7—7 in the direction indicated.
Figure 8:
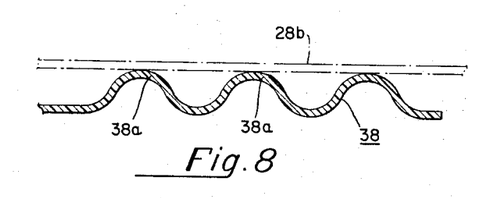
FIGURE 8 is a sectional view of details of FIG. 7 taken along the section line 8—8 in the direction indicated.
Figure 9:
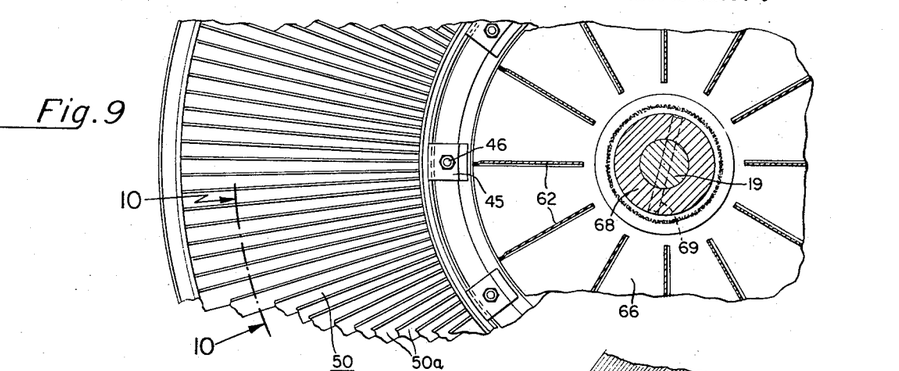
FIGURE 9 is a partly sectional plan view taken along the line 9—9 of FIG. 4 in the direction indicated.

The members 28 also support generally conical members 38 from above by a number of nut and bolt assemblies 37 which pass through aligned holes in the members 28 and 38 respectively. As shown in FIG. 7, the member 38 includes a number of slanted upstanding water-guiding portions 38a which are, for example, pressed outwardly of the member 38. Portions 38a have their tops in contact with the lower surfaces of members 28a and 28b respectively. They are angled as shown in FIG. 7 to impart a spiral path to the incoming warmed water. This spiral path, from the outside toward the inside of apparatus 10, is generally clockwise as viewed from above.

The inwardly-turning terminal portions of the G-sectioned members 30 support first annular louver assemblies 40 having vanes 40a whose inner edges are held by rims 40b. These rims are supported on circular gaskets 43a which rest on the upper surfaces of the members 29a and 29b respectively. A plurality of resilient C-clamps 39 help to keep the outer rims 40c of the louver assemblies 40 fixed positionally to members 30.

The conical members 29a and 29b are suspended from the lower horizontal portions of the G-sectioned members 30 by a plurality of spaced vertical supporting pins 41 which are bolted or otherwise connected between the members 30 and the outer edges of the members 29.

Figure 10:
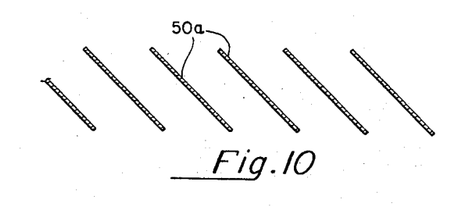
FIGURE 10 is a fragmentary sectional view taken along the section line 10—10 of FIG. 9 in the direction indicated.

The members 29 also support second annular louver assemblies 50 in each heat-exchange stage. They are very similar in their general design to assemblies 40 and concentric therewith except that they have a smaller diameter. The vanes 50a are slanted as shown in FIG. 10 so that the air sucked through them will travel in a clock-wise path, in the same way as the air passing through vanes 40a. A plurality of outwardly inclined support straps 42 engage the outer rims 50c of assemblies 50, the lower ends of the straps being bolted as by nut and bolt assemblies 43 to intermediate shoulder portions of the members 29a and 29b. The inner rims 50b of the second louver assemblies 50 rest upon resilient gaskets 44 disposed on the upper surfaces of the members 29a and 29b. The inner rims are held in place by a number of apertured retaining plates 45 that are bolted to the members 29a and 29b by nut and bolt assemblies 46.

In order to carry off water which has been cooled by the present apparatus to the circulating system for the space being cooled two water outlet ducts 55 are provided for each stage. Ducts 55 communicate with the interiors of the volumes enclosed by the members 30a and 30b by means of apertures 56 formed therein. The other ends of these ducts are coupled to the hollow supporting posts 13 and 14 which are connected with the circulating system of the enclosure being cooled.

Centrally disposed within the apparatus is a fan assembly indicated generally at the numeral 60, which is connected to the revolving fan shaft 19. The assembly 60 comprises a plurality of vertically disposed blades 62 having upper compressor sections 62a which are substantially vertical. It also comprises smaller angled portions 62b. The upper portions 62a have a somewhat greater radius than the lower portions 62b. The bottom portions 62c have a somewhat greater radius than the portions 62b adjacent thereto. The blades 62 have upper and lower tab portions 62d which engage radially-oriented slits formed in the two horizontal disk members 64 and 66. The inner edges of the blades 62 are spaced from the hub 68 to assist in reducing the overall weight of the apparatus. The disks 64 and 66 are welded to the hub 68 which is pinned to the shaft 19 by pins 69.

Operation

When the motor 22 drives the shaft 19 at high speeds, the upper blade parts 62a act as compressors and drive air outwardly over the upper surfaces of the members 28a and 28b and between beams 32 on opposite sides of the apparatus. This creates an inward and upward flow of air between the lower surfaces of the members 28a and 28b and the upper surfaces of the members 29a and 29b. The external air is sucked inwardly through beams 34 and thence through the first louver assembly 40 (of the upper stage) whose vanes 40a gives it a clockwise rotation. This clockwise rotation causes the air stream above louver 40 to take an inwardly spiralling path.

Figure 6:
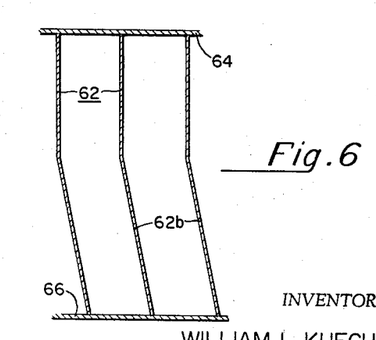
FIGURE 6 is a fragmentary sectional view taken along the section line 6—6 of FIG. 4.

While the external air is being sucked inwardly, being given an inwardly spiralling motion and moved upwardly, warm water from the cooled enclosure is applied via posts 11 and 12 and ducts 25 to the regions between the members 28a, 28b and the next lower members 38. After the water comes through the apertures 26 it strikes the upper surface of members 38 at high speed. It is thereby forced upwardly between the slanted projecting portions 38a, against the downwardly-angled portions 38b, and then downward over the inner top rim of the members 38. The water is thus impelled with a spiralling component of motion in the same clockwise direction as the incoming air passing through louvers 40 and 50. The water is first divided by the portions 38a and then is broken into droplets when it strikes the portions 62b of the blades 62 which are revolving clockwise at high speed. Thus, the regions above louvers 50 will be a contact region in which there is a spiralling current of air with water particles entrained therein. It will be noticed in FIG. 6 that the portions 62b are angled in such a way relative to the rotation of fan 60 that the portions 62b will thrust the droplets downward. The portions 62b impart to the air below the members 38 (and to the water particles entrained therein) a rotational component which is also clockwise. The rising current of air also tends to break up the water above the louvers 50 into smaller particles.

Should any water collect just below fan portions 62c the latter portions being wider than portions 62b will impel the water outwardly so that it becomes part of the swirling suspension above louvers 50.

It will be recalled that the incoming air is initially given a clockwise inwardly spiralling movement by passage through the first louvers 40 at a predetermined velocity. The blade portions 62b help to produce the circulating suspension of the liquid particles in the gas initially by their ability to break up whatever liquid particles hit them and also by creating just outside their outer edges a centrifugal current of the air. The main centrifugal field exerted on the liquid particles is produced, however, by the upwardly and inwardly spiralling flow of the gas. As a result, the heaviest water particles are impelled the most outwardly. Medium-sized water particles tend to cluster midway between the fan and the outer edge region of cone 38. Finest particles assemble near the tips of blade portions 62b and some of them are agglomerated into larger particles by collision with one another or with larger-sized particles.

It can thus be seen that there will be a dense suspension of water particles in the swirling air currents above louvers 50. The myriad particles in suspension will present a very great aggregate surface to the incoming cooling air. As a result, the heat in the water particles will be very efficiently transferred to the air by heat-exchange.

The heavy particles may be impelled outwardly with such force that they splatter against the under surface of the members 38 and are broken into smaller particles. Some of these particles will coalesce on the under surface of the member 38 and will tend to drip down as larger particles toward the first louver assemblies 40, either through louvers 50 or past rims 50c. Medium-sized particles will also migrate outwardly under the influence of centrifugal force and may coalesce with other particles and drip down through louvers 50 or past rims 50c.

The water which goes below louvers 50 will be caught up in the rotational air flow just above the first louver 40 and will be subdivided and subjected to a centrifugal force field similar to that above louvers 50. This region above the first louvers therefore constitutes an additional contact region having innumerable water droplets of varying sizes entrained in an inwardly spiralling air current. Thus the heaviest water particles above louvers 40 will eventually make their way outward toward the inner vertical surfaces of the members 30. They will collect in the gutters formed by the lower inwardly folded parts of the walls of members 30 including the inner vertical surfaces thereof. The water will leave these gutters via the apertures 56 and ducts 55 and flow to the interiors of the cold water return posts 13 which connect with the circulatory system.

Simultaneously as a result of the compressor action of blade portions 62a and the action of portions 62b, the water-heated air spirals inwardly and upwardly through the water particles above the first and second louvers of each stage, past the fan blades, and finally is pumped outwardly between the elements 16 and 28b in the top stage and between 28a and 28b of the lower stage. It is expelled into the ambient atmosphere after passing through beams 32a, 32b, etc. A minimal amount of the water particles in the suspensions above the louvers will be so fine that they will escape the repellant action of the blade portions 62b or evaporate and go out with the air.

FIGS. 11 through 18 show still another form of the present invention. Structurally, it is similar to the embodiment previously described especially with respect to the general shape of the fan blades and the generally conical shapes of its component parts. Instead of conventional angled-vane louvers, however, it uses the expanded plastic or metal louvers shown in these figures. Furthermore, the coolant water is introduced within the classification stage by a number of angled nozzles.

Referring more particularly to FIGS. 11–18 there is shown a top generally conical member 76 with a central aperture formed therein through which protrudes the upper end of rotary fan indicated generally at the numeral 85. The upper end is journalled within a top bearing similar to the bearing 18 shown in FIG. 4. The apparatus shown in FIG. 12 has three compressor-heat-exchange stages although it should be understood that any number may be used since the process occurring in each of them parallels the process in all others. The top stage is bounded by the top conical plate 76 and the generally conical structure consisting of the joined truncated conical members 78a and 78b. The middle stage is bounded by 78a, 78b and 80a, 80b. The lowest stage is bounded by 80a, 80b and 82a, 82b. Each stage is in itself divided into two main chambers or sections by an intermediate conical member such as member 77 in the top stage, 79 in the middle stage, and 81 in the lowest stage. The compressor sections of each stage are bounded as follows: top stage, members 76 and 77; middle stage, members 78a, 78b and 79; lowest stage, members 80a, 80b and 81. The heat-exchange sections are bounded as follows: top stage, member 77 and members 78a, 78b; middle stage, member 79 and members 80a, 80b; lowest stage, member 81 and members 82a, 82b.

As in the prior embodiment, the fan 85 has integral top, middle and lower sets of fan blades 86, 87 and 88 respectively. The fan shaft 86e has a sheave 111 toward its lower end. Belts 119 encircle this sheave 111 and sheave 108 which is fixed to a driving motor 107 that is mounted on beams under the apparatus 70. The upper portions of the blades of each set, i.e., portions 86a, 87a, and 88a respectively, have a greater diameter than the lower portions. They are the compressor portions used to suck air up from the next-preceding heat-exchange stage and pump it out opposite sides of the apparatus to appropriate guide baffles as will be explained hereinafter.

The lower portions of the blades of each set, i.e., portions 86b, 87b, and 88b, have smaller diameters. They are primarily used to prevent the finest of the particles of water which are produced and which exist in swirling suspension in the heat-exchange sections of each stage from escaping with the spiraling air into the ambient atmosphere. They also, to a certain extent, assist in reducing larger particles of water within that stage to smaller particles thereby increasing the total effective contact surface of that stage.

Figures 14, 15, 16:
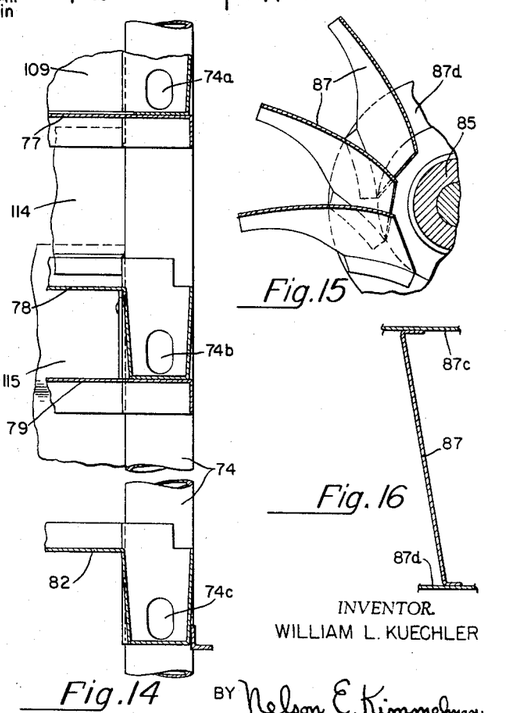
FIGURE 14 is a sectional view of a part of the apparatus shown in FIG. 11 taken along the section lines 14—14.
FIGURE 15 is a sectional view of part of the apparatus shown in FIG. 12 taken along the section lines 15—15.
FIGURE 16 is a sectional view of part of the apparatus shown in FIG. 12 taken along the section lines 16—16.

The sets 86, 87 and 88 of fan blades have their upper edges respectively connected to upper disks 86c, 87c, and 88c while their lower edges are respectively connected to smaller-diameter disks 86d, 87d, and 88d, the two disks being mounted to the shaft 85e. The inner edges of the blades are spaced from the fan shaft. This is done to lighten the fan structure. Incidentally, it facilitates the upward movement of the air from the contacting section to the compressor section above it. As shown in FIGS. 15 and 16, the blades are angled forwardly in the direction of the motion of the shaft for reasons to be explained more fully hereafter.

Within the heat-exchange sections of the stages are disposed respectively two sets of annular louver members 96, 97 and 98, and 99, 100 and 101. In the top stage the louver 96 is connected at its inner edges to the junction of members 78a and 78b and to the bottom surface of conduit 93 at its outer edge. The louver 99 is also connected at its outside edge to conduit 93, but its inner edge is connected to the inclined surface of member 78a. In the middle and lowest stages the corresponding louvers are similarly suspended.

The overall apparatus 70 is supported by four posts 71, 72, 73 and 74 placed at the corners thereof. Two of these posts, namely 71 and 72, are hollow and are connected to a flanged input pipe 105 by pipes 106. The input pipe 105 is intended to be connected to the warm water water output of the circulating system for the coolant within the enclosure to be cooled. Thus, water which has been warmed by heat-exchange with the air in the enclosure is pumped upward through the hollow posts 71 and 72. On each stage, such as the top and intermediate stage shown in FIGS. 13 and 14, there are inverted U-sectioned input conduits such as the conduits 109a and 78e, etc., which connect to apertures within the walls of the hollow posts 71 and 72. Conduit 109a is formed integrally with the wall 109. Conduit 78e lies between upstanding edge portions 78c and 78d which are integral with the member 78.

These input conduits communicate with generally V-sectioned conduit rings 93, 94, etc., located just below horizontal sections near the edges of members 77, 79, 81, etc. by means of the oval openings 77b, 79b, etc., formed therein. The warm water because of the applied pressure, is then ejected from the nozzles 91 which communicate with the conduit rings 93 and 94. The nozzles 91 are angled in the direction of rotation of the fan 85 and are connected in a circular arrangement at predetermined intervals around the ring-like conduits 93, 94, etc. The ends of the nozzles 91 are somewhat flattened and flared to promote comminution and wider distribution of the warm water. The nozzles 91 break up the water to a certain extent and set up an inwardly-spiralling stream of water some of which reaches the outer edges of the portions 86b, 87b, 88b of the fan blades 86, 87 and 88. This results in further comminution of the water into smaller particles which are flung outwardly thereof.

Figure 11:
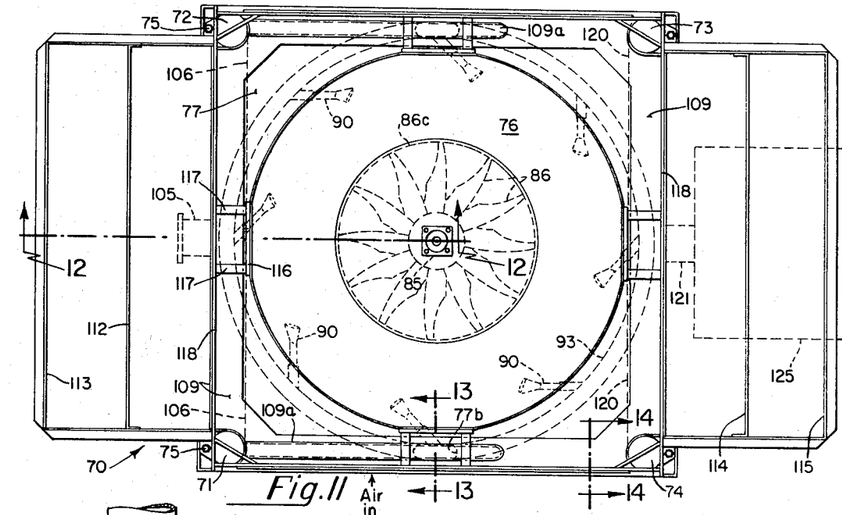
FIGURE 11 is a plan view of another form of the present invention.
Figures 12, 17, 18:
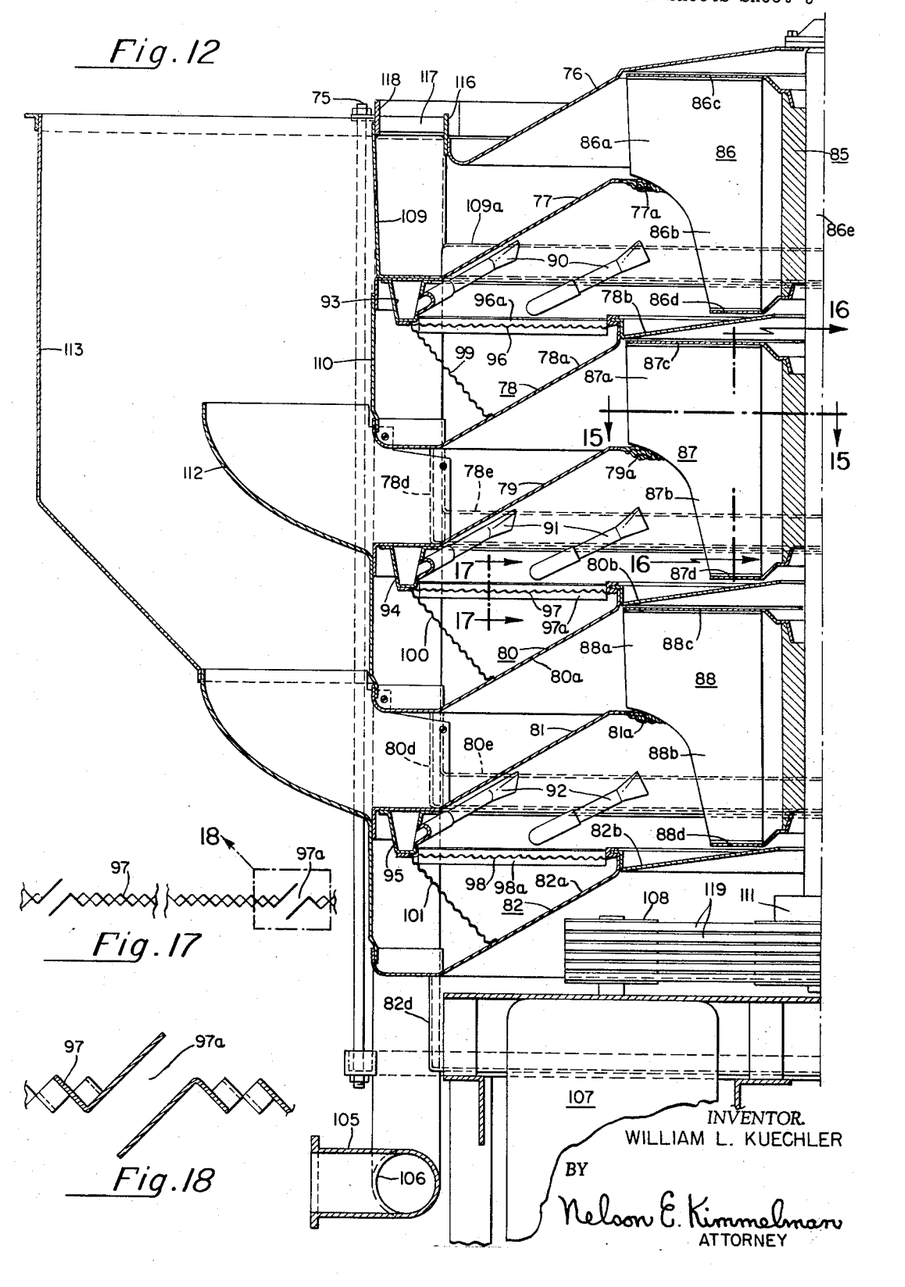
FIGURE 12 is a sectional view of the apparatus joining FIG. 11 taken along the section lines 2—2 in the direction indicated.
FIGURE 17 is a sectional view of part of the apparatus shown in FIG. 12 taken along the section lines 17—17.
FIGURE 18 is an enlargement of that part of the FIGURE 17 appearing in rectangle 18.
Figure 13:
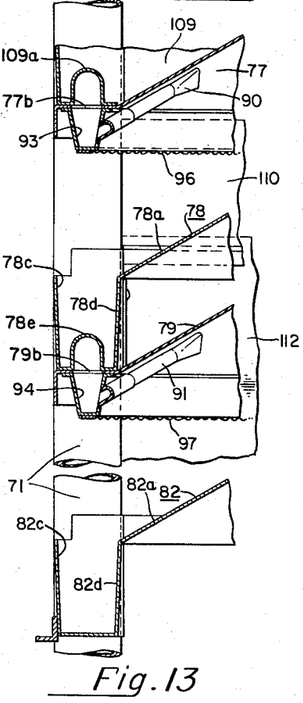
FIGURE 13 is a sectional view of part of the apparatus shown in FIG. 11 taken along the section line 13—13.

As the fan 85 rotates at high speed, the air within the heat-exchange sections also is moved in a generally rotary direction and so are the particles of water entrained therein. Assisting in the comminution of the water is the action of the compressor sections 86a, 87a and 88a which suck in air, as indicated in FIG. 11, from opposite sides of the apparatus 70. On these opposite sides, as in the previous embodiment, there are spaced panels which prevent warm air from escaping out of the sides of the apparatus 70 through which air is drawn in. These panels may be the integral portions 78d, 80d of the members 78, 80, etc. and the top panel 109. The incoming air rushes up first through the louvers 99, 100, 101 and then through 96, 97 and 98. Both the first set of louvers 99–101 and the second set 96–98 are made to promote the inwardly spiralling air currents in each heat-exchange stage. They may both be made of expanded metal such as so-called "Conidure" screening, or may be made of similar expanded plastic materials. The second louvers 96–98 are slanted as shown in FIGS. 17 and 18 in the direction of rotation of the fan 85 to abet the inwardly-spiralling motion of the air mixture. They include a number of enlarged portions such as 97a shown in FIGS. 17, 18 and 12.

As a result of the reduction in the size of the water particles due to the inrushing air, to the action of nozzles 91 and the two sets of louvers, and to the direct impingement of the water on the classifying sections 86b, 87b and 88b of the fan 85, huge numbers of water particles of varying sizes will be created and moved along in a rotary current of air throughout the heat-exchange area. Affixed to the inner (upper) edges of the members 77, 79 and 81 are annular segments 77a, 79a and 81a of downwardly-sloping mesh or screen. This helps to prevent loss of water particles with the rising current of air by enabling the curved edges of the fans just below the portions 86a, 87a, etc. to drive down through portions 77a, 77b, etc., any water droplets present above them. The multitudes of warm water particles in the contact area will present a very large effective contact surface to the air therein. Consequently, very high efficiency heat-exchange is achieved.

Although the compressor sections of the fan 85 suck air inwardly through the heat-exchange sections of each stage which ultimately rises and passes out at right angles to the direction of the incoming air only a very small percentage of the water particles go out with the air. This is due to the fact that the portions 86b, 87b and 88b of the fan blades prevent the heavier-than-air water particles from moving inwardly past the fan because of their being flung outwardly by the fan on impact. They are also to a limited extent affected by the centrifugal force exerted on them between these blade portions. The air itself passes through and upwards out of the heat-exchange stage and into the hot air exhaust stages just above and are expelled via baffles 112–115. The baffles prevent the expelled hot air from mixing with the cooler ambient air coming in on the sides of the apparatus in quadrature therewith.

The fan shown in FIG. 12 and in enlarged and sectional views in FIGS. 15 and 16 has proved highly efficient in its compressor action and in its air-from-water particle separation action. To the extent that the blowing efficiency of the lower portions 86b, 87b and 88b is lessened, the blowing efficiency of the upper portions 86a, 87a, and 88a is effectively increased with a consequent improvement of the overall volumetric efficiency. To this end, as shown in FIG. 16, the fans are angled forwardly in the direction of motion. The blades are also curved as shown in FIG. 15 and because of these two factors, the lower portions of the blades may have a forward angle of the order of 45°, for example, to the radial. This forward angle makes the lower portions of the blades relatively inefficient as an air blower but because the water particles that impinge on the blade surfaces have a relatively high mass, the lower portions of the fan will operate quite efficiently to prevent the finest liquid particles from escaping with the air.

A number of the water particles from each heat-exchange section drop down through the two louvers onto the upper surfaces of the conical members 78a, 80a and 82a. The water thus dropping down will have a component of motion in the same direction as the swirl of air and water particles in the heat-exchange region above.

The water will fall into the trough formed in the middle stage by the walls 78c and 78d which appear on opposite sides of the apparatus and in the lower stage in the trough formed by the walls 82c and 82d. In the topmost stage, the water will be contained by the panel 109 and the inwardly-bent horizontal portions thereof on all sides. In those troughs which include the hot water input conduit such as conduits 109a and 78e the cooled water will tend to reduce the temperature of the water to be sprayed from nozzles 91. Under the influence of gravity, the water will be drained from these troughs into the hollow post 74 via apertures 74a, 74b, 74c formed therein which communicate with aligned apertures in the outer trough walls contiguous thereto. There are similar aligned apertures (not shown) for the post 73 at each level. The hollow posts 73 and 74 at their lower ends are joined by pipes 120 to a common pipe 121. The latter feeds into a discharge sump 125 which may be coupled by an appropriate flanged element to the input of the circulatory system within the enclosure to be cooled.

It should be realized, of course, that while both of the embodiments shown have employed two vertically displaced contacting zones per heat-exchange stage, other numbers of such contacting zones may alternatively be used. In some cases only one contacting zone may be desired whereas in others more than two may be useful. The particular spatial relation of the contacting zones in each stage may also vary according to choice and particular application involved. Other means of applying the coolant can also be alternatively devised without affecting the scope of this invention. The fans and the fan blades may have still other configurations, or the compressor sections thereof may be entirely separate from the smaller diameter portions if desired. The particular ways in which the downwardly sloping boundary walls of the heat-exchange section are fabricated may also vary as may the materials involved in the construction of the apparatus.

Still other modifications of this invention will undoubtedly occur to ones skilled in the art upon reading the present specification which do not depart from the essence of the present invention.

In addition, the apparatus, while described in terms of a cooling system, may be employed for other purposes such as absorption, reaction or other general contacting operations. An example of absorption would be the removal by water of the ammonia present in a mixture of air and ammonia gas. Another example might be the dehumidification of air by contacting air with a hygroscopic liquid such as lithium chloride.

Of course, it may also have utility in "stripping" operations, that is, where a component of a liquid is removed by passing a gas through it. It is also useful in many kinds of reaction operations either with air as the input gas or with other input gases or mixtures thereof.

Another use for this invention resides in so-called "scrubbing" operations wherein solid impurities entrained in a gas, for example, are removed by passage of the gas through a liquid. Thus it would be possible to apply impure air to the input of the apparatus and pass it through water in the contacting sections. The impurities in the air would be trapped by the water to form a suspension (or a solution if the impurities dissolved in water) and the output from the compressor sections would be "scrubbed" air for a particular purpose.

As my invention comprehends many other alternative structures and processes which do not depart from the essence thereof, I desire it to be limited solely by the claims which follow.

I claim:

1. Apparatus for contacting a first substance with a second substance having a lesser density than said first substance, said apparatus comprising:
    (a) fan means having first and second pluralities of blade portions, said first portions being less wide than said second portions,
    (b) a first section bounded generally by a plurality of members having at least one surface which slopes generally downwardly and outwardly, said first section having respective means for introducing said having a centrally located region in which said first first and second substances therein, said first section blade having a centrally located region in which said first blade portions are disposed, said first section also including at least one apertured contacting means, and
    (c) a second section having a centrally located region in which said second blade portions are disposed, said latter region communicating with the central region of said first section, said second blade portions upon rotation of said fan drawing said second substance out of said first section and expelling it via said second section from said apparatus.

2. The contacting apparatus according to claim 1 wherein said first section includes a plurality of said apertured contacting means which are displaced vertically from one another.

3. The contacting apparatus according to claim 1 wherein said first substance is a liquid and wherein said means for introducing said liquid into said first section includes conduit means extending partially in said second section and communicating with said first section by way of apertures in said sloping-surfaced members.

4. The contacting apparatus according to claim 1 wherein said first substance is a liquid and wherein said means for introducing said first substance includes a plurality of nozzles disposed within said first section.

5. The apparatus according to claim 1 wherein said one sloping surface constitutes generally the lower boundary of said first section.

6. Apparatus for contacting a liquid and a gas comprising:
    (a) fan means having first and second pluralities of blade portions, said first portions being less wide than said second portions,
    (b) a first liquid-gas contacting section bounded generally by a plurality of generally conical members, said first section having respective means for introducing said liquid and said gas therein, said first section having a centrally located region therein in which said first blade portions are disposed, said first section also including an upper contacting member and a lower contacting member, said contacting member being formed with apertures which direct said incoming gas to flow in a rotary direction substantially the same as the direction in which said fan rotates, and
    (c) a second section having a centrally located region in which said second blade portions are disposed, said latter region communicating with the central region of said first section, said second portions tending to draw said gas from points external to said apparatus through said upper and lower contacting members and to expel said gas from said apparatus via said second section.

7. The contacting apparatus according to claim 6 wherein said means for introducing said liquid include a conduit which extends partially into said second section and communicates with said first section via an aperture in one of said conical members and wherein said upper and lower contacting members each include a plurality of vane elements which are angled in substantially the same direction.

8. A contacting apparatus according to claim 7 wherein said first section is also provided with means disposed under said aperture in said conical member for dispersing said liquid into a plurality of angled streams which are directed inwardly toward the outer edges of said first blade portions.

9. The contacting apparatus according to claim 6 wherein said upper and lower contacting members are angled with respect to one another.

10. The contacting apparatus according to claim 6 wherein the upper conical member of said first section has located at its top edge a portion which slopes inwardly and downwardly.

11. The contacting apparatus according to claim 10 wherein said downwardly sloping portion at the top edge of said conical member is provided with a plurality of apertures, said portion underlying the outer edges of said fan blades just below said second blade portions.

12. The apparatus according to claim 6 wherein said upper and lower contacting members are made from expanded sheet materials having angled apertures formed therein.

13. Cooling apparatus comprising:
    (a) high speed fan means having first and second pluralities of blade portions, said first portions being less wide than said second portions,
    (b) a heat-exchange section bounded generally by a plurality of members having surfaces which slope generally downwardly and outwardly, said heat-exchange section having means for introducing a liquid 
coolant therein, said heat-exchange section also having means by which air may be introduced therein, said first section also having upper and lower coolant-air contacting members which has apertures for imparting to air passing therethrough a rotary component which is the same as the direction in which said fan rotates, said heat-exchange section also having a centrally located region in which said first blade portions are disposed, and (c) a hot air exhaust section located above and adjacent to said heat-exchange section, said exhaust section having a centrally located region in which said second blade portions are disposed, said latter region communicating with the central region of said heat-exchange section, said second portions drawing air external to said apparatus through said lower and upper contacting members and up into said first section whence it is discharged from said apparatus.

14. The cooling apparatus according to claim 13 wherein said upper and lower contacting members are substantially parallel to one another, wherein said means for introducing said coolant includes a conduit which passes into said exhaust section and communicates with said heat-exchange section via an aperture formed in one of said sloping-surfaced members and wherein means are provided within said heat-exchange section below said aperture for dividing said incoming coolant into a plurality of angled streams directed toward the outer edges of said first blade portions.

15. The cooling apparatus according to claim 14 wherein said first blade portions are angled with respect to said second blade portions so as to drive particles of coolant impingent thereon generally downward.

16. The cooling apparatus according to claim 14 wherein said means for dividing said incoming coolant comprises a generally conical member having a plurality of angled, upwardly-extending projections which engage one of the members which bound said heat-exchange section and wherein said means for introducing said coolant also includes at least one vertical hollow post which communicates with said conduit and also serves to assist in supporting said apparatus.

17. The cooling apparatus according to claim 13 with the addition of means disposed toward the lower end of said heat-exchange section for removing coolant therefrom.

18. The cooling apparatus according to claim 17 with the addition of at least one hollow supporting post which communicates with said means for removing said coolant and assists in removing said coolant from said heat-exchange section.

19. The cooling apparatus according to claim 13 with the addition of means for limiting the entry of air into said heat-exchange sections on opposite sides of said apparatus and with the further addition of means for limiting exhausting of said hot air to different opposite sides thereof.

20. The cooling apparatus according to claim 13 wherein said means for introducing a liquid coolant in said heat-exchange section includes conduit means in said hot air exhaust section and also includes a curved conduit in said heat-exchange section which communicates with said conduit means in said hot air exhaust section and wherein a plurality of angled nozzles are disposed in said heat-exchange section, said nozzles being in communicating relation with said curved conduit.

21. The cooling apparatus according to claim 20 wherein the outer edges of said upper and lower contacting members are affixed to said curved conduit and their respective inner edges are affixed to different points on the upper surface of the lower member which bounds said heat-exchange section.

22. The method of contacting in a predetermined zone which comprises:

(a) producing a current of gas in a generally inward spiral path in said zone, said path also having a generally upward component throughout said zone, (b) dispersing minute particles of a liquid in said path thereby producing a suspension of said particles in said gas, (c) subjecting said suspended particles to centrifugal force produced by said current of gas, said force being at least ten times as strong as gravity whereby substantially all of said particles are effectively prevented from movement inward beyond a predetermined point but said gas is permitted to proceed further in said inward path, (d) providing at least one stationary apertured baffle means in said path through which said gas and liquid are passed, and (e) recovering at least some of said particles for reuse.

23. The method according to claim 22 with the addition of the step of providing a plurality of vertically displaced contacting zones in said path for said gas and liquid.

24. The method according to claim 22 wherein said recovering step is accomplished by gravity.

References Cited

UNITED STATES PATENTS

| | | | |
|---|---|---|---|
| 1,780,255 | 11/1930 | Wagner | 261—84 |
| 1,898,807 | 2/1933 | Barnes | 57—257 X |
| 1,952,308 | 3/1934 | Bowen | 261—79 X |
| 2,213,881 | 9/1940 | Lauer | 55—223 |
| 2,672,330 | 3/1954 | Swenson | 261—84 |
| 2,847,083 | 8/1958 | Hibshman | 261—118 X |
| 2,941,872 | 6/1960 | Pilo et al. | 261—84 X |
| 3,105,105 | 9/1963 | Kittel | 261—79 X |
| 3,234,716 | 2/1966 | Sevin et al. | 55—407 X |
| 3,292,347 | 12/1966 | Hodgkinson | 55—257 |

HARRY B. THORNTON, *Primary Examiner.*

T. R. MILES, *Assistant Examiner.*

PATENT OFFICE

Washington, D.C. 20231

UNITED STATES PATENT OFFICE
CERTIFICATE OF CORRECTION

Patent No. 3,409,278                                                  November 5, 1968

William Lewis Kuechler

It is certified that error appears in the above identified patent and that said Letters Patent are hereby corrected as shown below:

Column 9, line 55, beginning with "(b) a first section" cancel all to and including "means, and" in line 64, same column 9 and insert instead -- (b) a first section bounded generally by a plurality of members having at least one surface which slopes generally downwardly and outwardly, said first section having respective means for introducing said first and second substances therein, said first section having a centrally located region in which said first blade portions are disposed, said first section also including at least one apertured contacting means, and --.

Signed and sealed this 10th day of March 1970.

(SEAL)
Attest:

Edward M. Fletcher, Jr.                          WILLIAM E. SCHUYLER, JR.

Attesting Officer                                                  Commissioner of Patents